(12) United States Patent
Chen et al.

(10) Patent No.: US 9,157,420 B2
(45) Date of Patent: Oct. 13, 2015

(54) DISH-TYPE STIRLING SOLAR GENERATOR

(71) Applicant: Wuhan Kaidi Engineering Technology Research Institute Co., Ltd., Wuhan (CN)

(72) Inventors: Yilong Chen, Wuhan (CN); Qingping Yang, Wuhan (CN); Yanfeng Zhang, Wuhan (CN)

(73) Assignee: Wuhan Kaidi Engineering Technology Research Institute Co., Ltd., Wuhan (CN)

( * ) Notice: Subject to any disclaimer, the term of this patent is extended or adjusted under 35 U.S.C. 154(b) by 120 days.

(21) Appl. No.: 14/062,854

(22) Filed: Oct. 24, 2013

(65) Prior Publication Data

US 2014/0047831 A1 Feb. 20, 2014

Related U.S. Application Data

(63) Continuation-in-part of application No. PCT/CN2012/075932, filed on May 23, 2012.

(30) Foreign Application Priority Data

May 24, 2001 (CN) .......................... 2011 2 0168826

(51) Int. Cl.
| | |
|---|---|
| *F03G 6/00* | (2006.01) |
| *F03G 7/00* | (2006.01) |
| *F01B 29/10* | (2006.01) |
| *F02G 1/04* | (2006.01) |
| *F03G 6/06* | (2006.01) |
| *F02G 1/043* | (2006.01) |
| *F03G 6/02* | (2006.01) |

(52) U.S. Cl.
CPC ................ *F03G 6/068* (2013.01); *F02G 1/043* (2013.01); *F03G 6/02* (2013.01); *F02G 2254/10* (2013.01); *F02G 2254/30* (2013.01); *Y02E 10/46* (2013.01)

(58) Field of Classification Search
CPC . F02G 1/043; F02G 2254/10; F02G 2254/30; F03G 6/02; F03G 6/068; Y02E 10/46
USPC ............................................... 60/517, 641.15
See application file for complete search history.

(56) References Cited

U.S. PATENT DOCUMENTS

2010/0300096 A1* 12/2010 Gandhi ........................ 60/641.8

* cited by examiner

*Primary Examiner* — Audrey K Bradley
(74) *Attorney, Agent, or Firm* — Matthias Scholl P.C.; Matthias Scholl

(57) ABSTRACT

A dish-type Stirling solar generator capable of running continuously day and night, including a dish-type Stirling solar generating set. The dish-type Stirling solar generating set includes a combustor, a position adjustment mechanism, and a bracket. The combustor includes an opening. The position adjustment mechanism is capable of adjusting the opening of the combustor to align or deviate from a heat receiver of the dish-type Stirling solar generating set. The position adjustment mechanism is disposed on the bracket of the dish-type Stirling solar generating set. The combustor is disposed on the position adjustment mechanism. A fuel supply system of the combustor is connected to the combustor via a main switch valve, a branch switch valve, a regulating valve, and a flexible conveying pipe.

20 Claims, 4 Drawing Sheets

DISH-TYPE STIRLING SOLAR GENERATOR

CROSS-REFERENCE TO RELATED APPLICATIONS

This application is a continuation-in-part of International Patent Application No. PCT/CN2012/075932 with an international filing date of May 23, 2012, designating the United States, now pending, and further claims priority benefits to Chinese Patent Application No. 201110135985.5 filed May 24, 2011, and to Chinese Patent Application No. 201120168826.0 filed May 24, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a dish-type Stirling solar generator capable of running continuously day and night, which belongs to the field of a complementary power generation combining biomass clean energy with the Stirling solar unit.

2. Description of the Related Art

According to the method for solar collection, the existing method for power generation by using the solar energy includes: tower concentrating solar power generation, parabolic trough concentrating solar power generation, and dish Stirling solar power generation.

The dish-type Stirling solar power generation unit is capable of automatically tracking the sun in two dimensions, and has a high the photoelectric convention efficiency and small starting loss. The dish-type Stirling solar power generation unit is so far a system that has the highest efficiency of solar power generation, exceeding 30%. The system almost consumes no water, and an output efficiency reaches 26% (a self-tracking mechanism consumes energy).

However, as the sunlight collectable on the ground is available in daylight, non-available during night, intensive in sunny day, and weak in cloudy day. Thus, the dish-type Stirling solar power generator operates unstably and cannot continuously operates for 24 hours, which seriously restricts the use thereof.

As an organic matter produced by the photosynthesis of plants, biomass is characterized in its wide distribution, large reserves, much cleaner than fossil energy, and zero-$CO_2$ emission. Biomass is the only clean energy that is able to burn in solid state, liquid state, and gas-state; and it is also a very important renewable resource.

Various biomass liquefaction technology, biomass gasification technology, and combustor technology for combustible gas and combustible liquid have been well developed and well known by the public.

SUMMARY OF THE INVENTION

In order to overcome the above technical problems of the conventional dish-type Stirling solar generating set, and to solve problems of the unstable operation and discontinuous power generation of the dish-type Stirling solar generating set, it is one objective of the invention to provide a dish-type Stirling solar generator capable of running continuously day and night. Gas fuel or liquid fuel is used as a second heat source of the generator. During nocturnal periods or cloudy days when the sunlight is too weak and the generator cannot reach the rated speed or output the qualified energy, the combustible gas (combustible liquid) is replenished to supply heat for power generation, so that problems of incapability of power generation during night and the unstable operation of the generating system are solved.

Furthermore, when using the biomass fuel as the second heat source, technical problems of combining the solar energy and the biomass energy are solved, thereby endowing the invention with advantages of zero-$CO_2$ emission and power generation using renewable and clean energy source.

To achieve the above objective, in accordance with one embodiment of the invention, there is provided a dish-type Stirling solar generator capable of running continuously day and night comprises a dish-type Stirling solar generating set. The dish-type Stirling solar generating set comprises a combustor comprising an opening, and a position adjustment mechanism of the combustor. The position adjustment mechanism is capable of adjusting the opening of the combustor to align or deviate from a heat receiver of the generating set. The position adjustment mechanism is disposed on a bracket of the generating set. The combustor is disposed on the position adjustment mechanism. A fuel supply system of the combustor is connected to the combustor via a main switch valve, a branch switch valve, a regulating valve, and a flexible conveying pipe.

In a class of this embodiment, the position adjustment mechanism is a telescoping mechanism, a driver of the telescoping mechanism employs a linear actuator, and the combustor is disposed on an output end of the telescoping mechanism.

In a class of this embodiment, the position adjustment mechanism is a bended linkage mechanism. Connecting rods of the bended linkage mechanism are connected via rotary actuators (comprising a pneumatic rotary actuator, a hydraulic rotary actuator, and an electric rotary actuator). The combustor is disposed on an output end of the bended linkage mechanism.

In a class of this embodiment, the bended linkage mechanism is a triple linkage mechanism comprising a first connecting rod, a second connecting rod, and a third connecting rod. The connecting rods communicate with each other via the rotary actuators. The first connecting rod is connected to the bracket of the dish-type Stirling solar generating set via the rotary actuator.

In a class of this embodiment, the fuel supply system is a combustible gas supply system comprising a gas-storage tank, a pump, the main switch valve, the branch switch valve, the regulating valve, and the flexible conveying pipe, which are connected via pipes.

In a class of this embodiment, the fuel supply system is a biomass supply system comprising a biomass gasification device, a purifier, the gas-storage tank, the pump, the main switch valve, the branch switch valve, the regulating valve, and the flexible conveying pipe, which are connected via pipes.

In a class of this embodiment, the fuel supply system is a liquid fuel supply system comprising a gas-storage tank, a pump, the main switch valve, the branch switch valve, the regulating valve, and the flexible conveying pipe, which are connected via pipes.

In a class of this embodiment, the fuel supply system is a liquefied biomass supply system comprising a biomass liquefaction device, a purifier, the gas-storage tank, the pump, the main switch valve, the branch switch valve, the regulating valve, and the flexible conveying pipe, which are connected via pipes.

The position adjustment mechanism of the combustor is started at night (or in cloudy or rainy days when the sunlight is not sufficient) to allow the combustor to move to the position of the heat receiver of the generating set. The fuel is supplied and ignited to heat the heat receiver, so that the generating set continues generating power.

In a class of this embodiment, the gas fuel for the combustion device is natural gas (methane, coal mine gas, coking gas, blast furnace gas, or well collected gas). In conditions of no sunlight (or the sunlight is insufficient), the natural gas is burned to ensure that the generating set operates continuously day and night.

In a class of this embodiment, the gas fuel for the combustion device is diesel oil (kerosene, gasoline, black mineral oil, carbinol, or alcohol). In conditions of no sunlight (or the sunlight is not sufficient), the diesel oil is burned to ensure that the generating set operates continuously day and night.

Advantages of the invention are summarized as follows: the gas fuel or the liquid fuel is used as the second heat source of the dish-type Stirling solar generator. During nocturnal periods or cloudy days when the sunlight is too weak and the generator cannot reach the rated speed or output the qualified energy, the combustible gas (combustible liquid) is replenished to supply heat for power generation, so that problems of incapability of power generation during night and the unstable operation of the generating system are solved.

The invention particularly combines the biomass gasified or liquefied energy with the Stirling solar generating set to form a clean energy power generator being capable of operating continuously and stably.

The technical solution of the invention involves power generation by combining the solar energy with the biomass energy, which is superior in the stable power generation, small influence by the climate variation, almost consuming no water, and zero-$CO_2$ emission.

In the figure, the reference number 1 represents a dish-type Stirling solar generating set, 1a represents a bracket thereof, 1b represents a heat receiver thereof, 1c represents a dish mirror, 1d represents a bracket of the dish mirror, the bracket comprising a sunlight tracker, 2 represents a combustor, 2c represents a movement direction of the combustor, 2d represents a movement terminal of the combustor, 3 represents a position adjustment mechanism of the combustor which may be an air-, liquid-, or electricity-driven telescoping mechanism, 4 represents a biomass gasification device or biomass liquefaction device, 4a represents a gas-storage tank, 4b represents a pump, 4c represents a main switch valve, 4d represents a purifier, 5 represents a branch switch valve, 6 represents a regulating valve, and 7 represents a flexible conveying pipe which is connected to a fuel inlet of the combustor 2.

Figure 2:
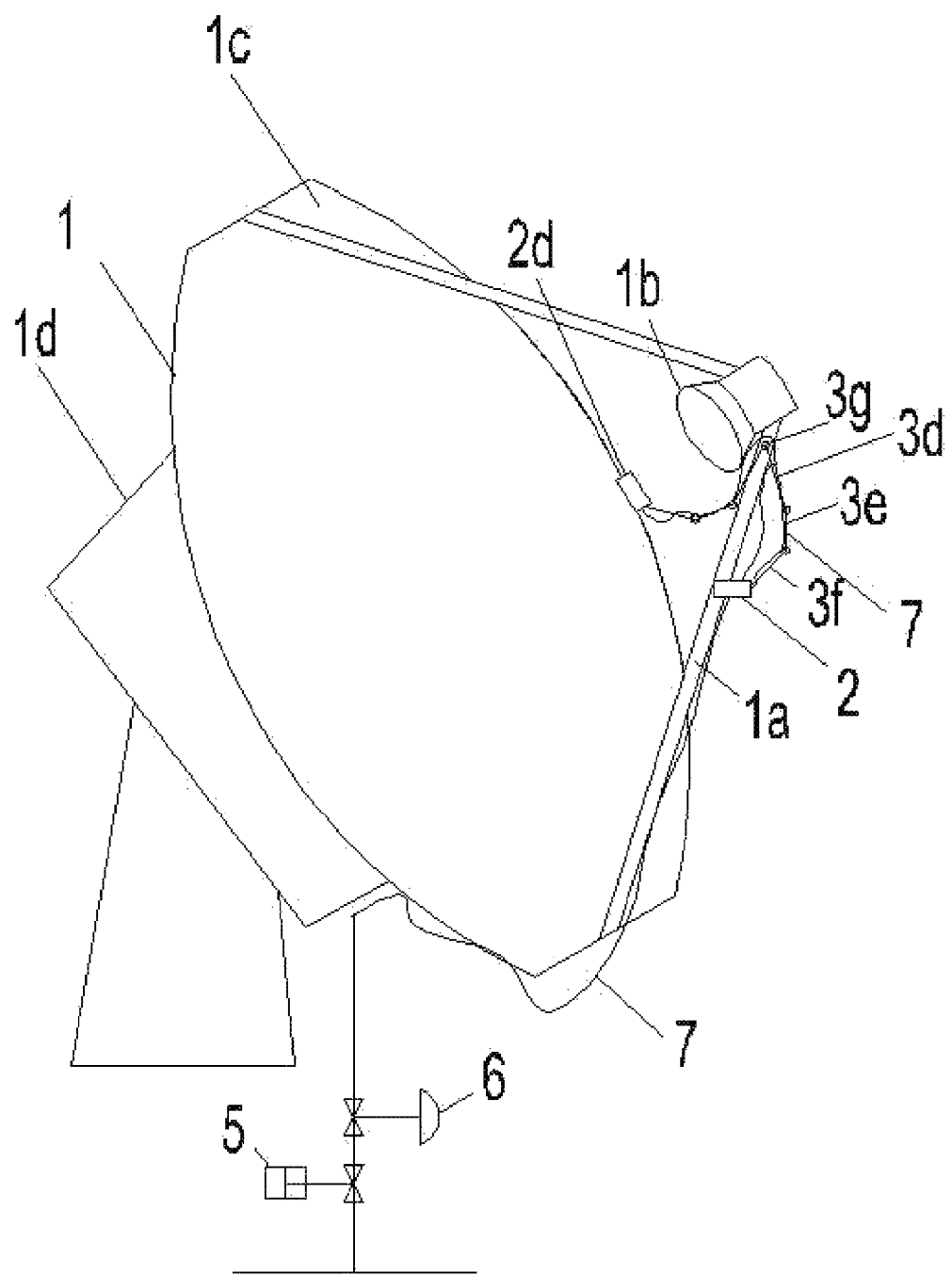

FIG. 2 is a schematic diagram of a position adjustment mechanism of a combustor of the invention where the position adjustment mechanism employs a bended linkage mechanism.

Figure 3:
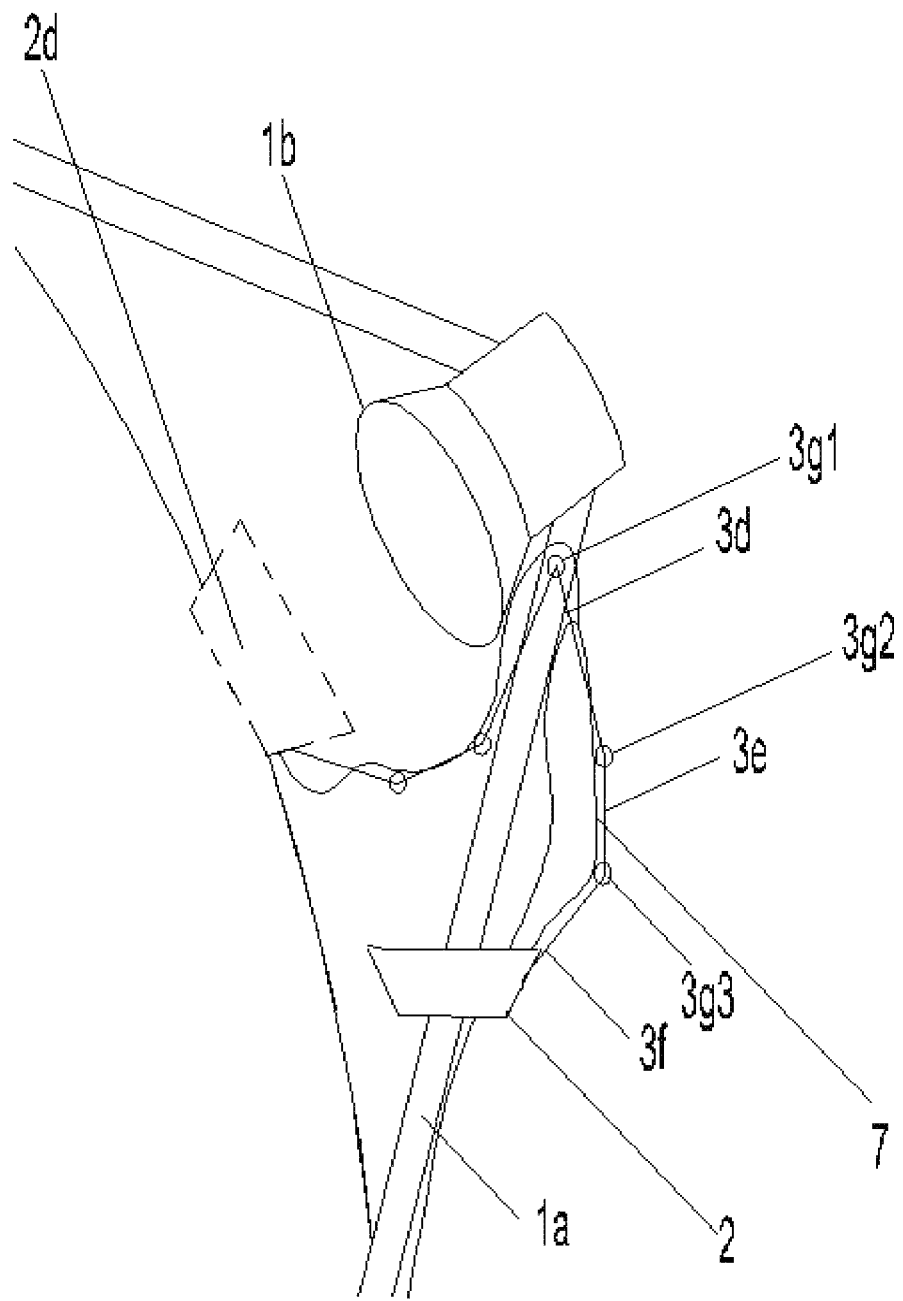

FIG. 3 is a local enlarged view of a bended linkage mechanism of the invention.

Figure 1:
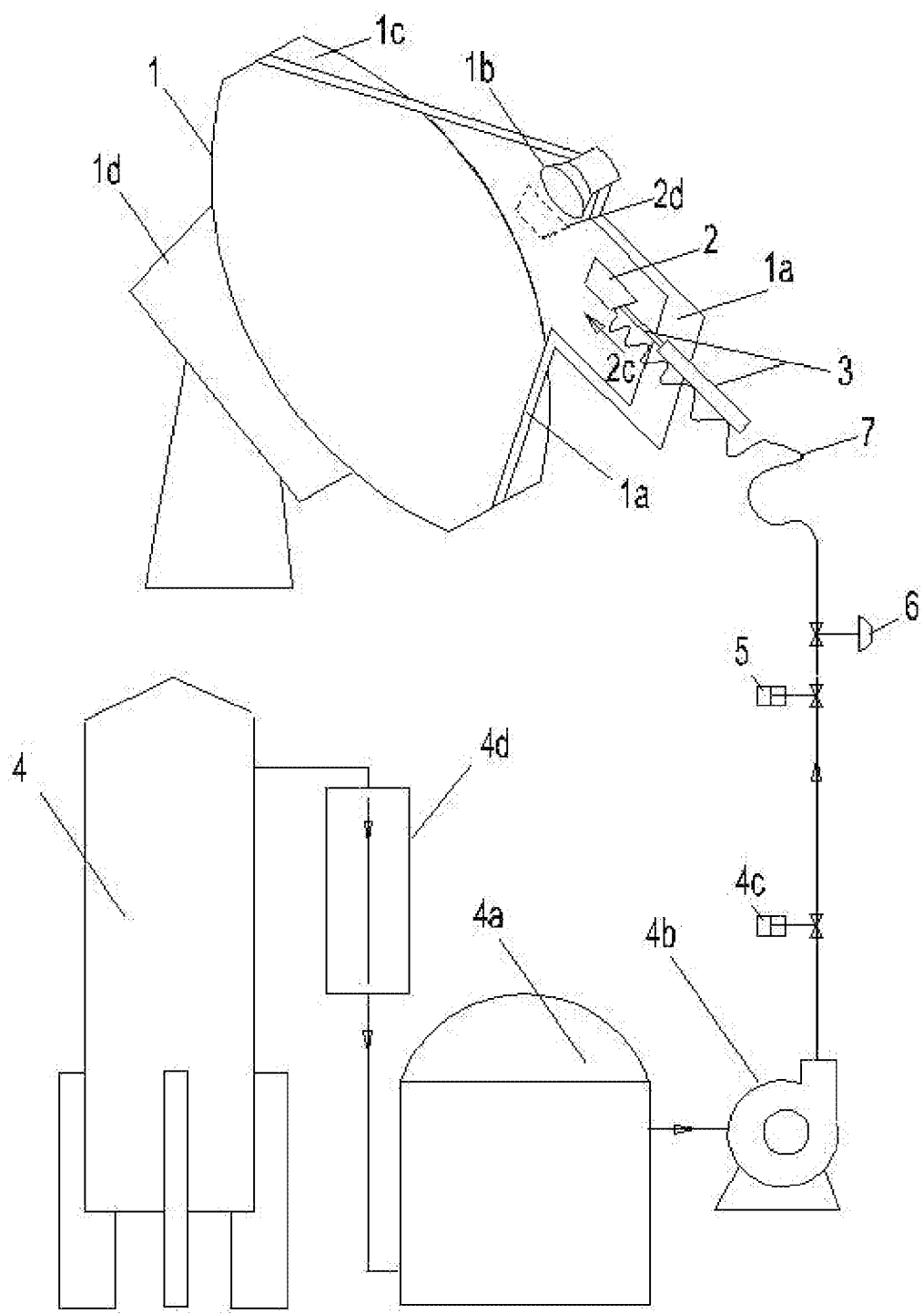
FIG. 1 is a schematic diagram of a dish-type Stirling solar generator in accordance with one embodiment of the invention.

In FIGS. 2 and 3, the reference number 1 represents a dish-type Stirling solar generating set, 1a represents a bracket thereof, 1b represents a heat receiver thereof, 1c represents a dish mirror, 1d represents a bracket of the dish mirror, the bracket comprising a sunlight tracker, 2 represents a combustor, 2d represents an optimum heating position of the combustor, 3d represents a first connecting rod, 3e represents a second connecting rod, 3f represents a third connecting rod, 3g represents rotary actuators, an initiating terminal of the first connecting rod 3d is connected to 1a via 3g1, a terminal of 3d is connected to an initiating terminal of 3e via 3g2, a terminal of 3e is connected to an initiating terminal of 3f via 3g3, a terminal of 3f is fixed on the combustor 2, 5 represents a branch switch valve, 6 represents a regulating valve, and 7 represents a flexible conveying pipe which is connected to a fuel inlet of the combustor 2. 5 is connected to a main switch valve via a fuel conveying pipe, and fuel supply systems in the figures are the same as that in FIG. 1.

Figure 4:
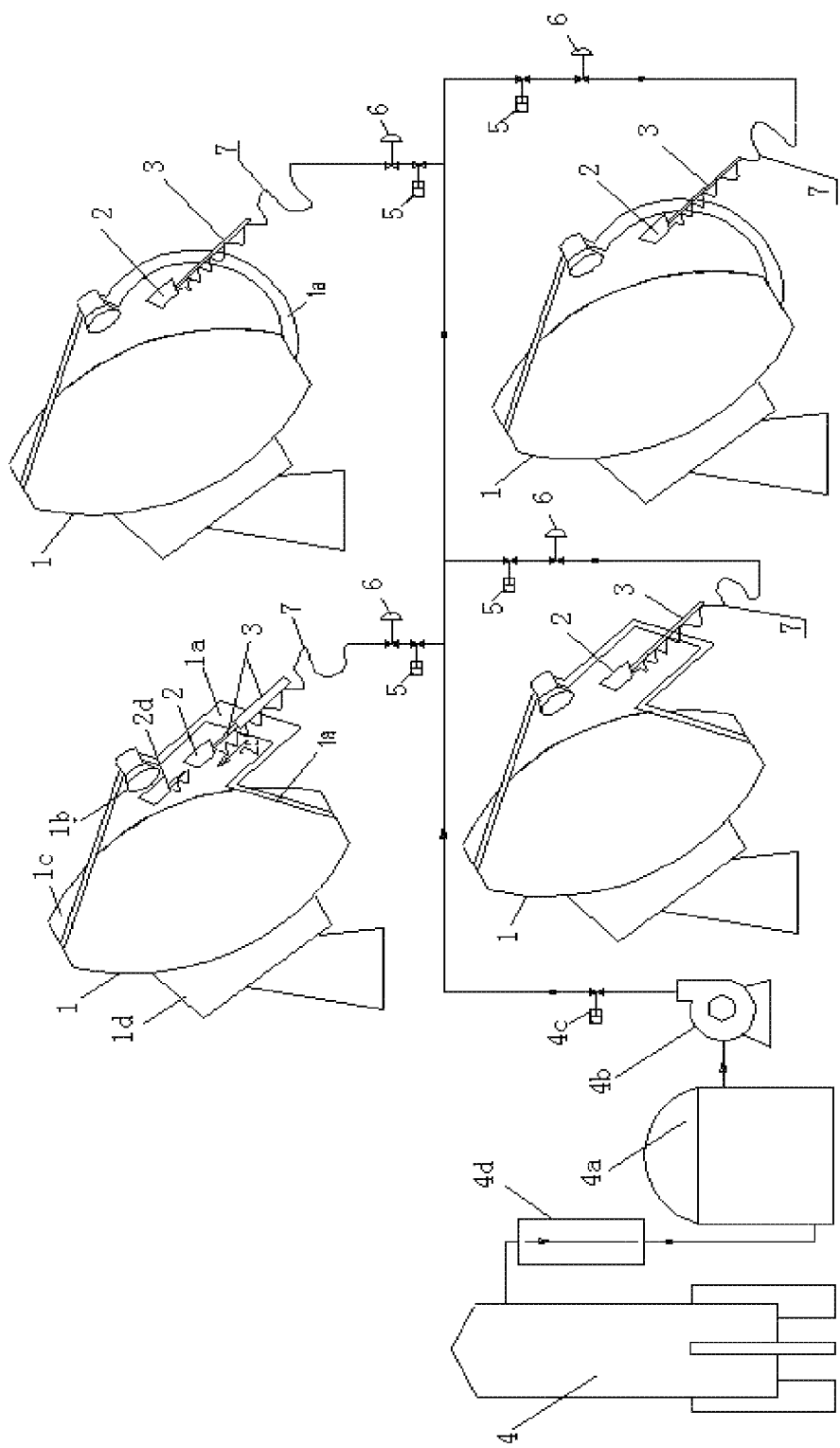

FIG. 4 is a systematic diagram of a Stirling electric power plant of the invention.

In the figure, fours dish-type Stirling solar generating sets are combined which share a combustible gas (combustible liquid) supply system. The number of the dish-type Stirling solar generating sets can be increased or decreased based on the desired gross power of a generating plant.

In the figure, the reference number 1 represents a dish-type Stirling solar generating set, 1a represents a bracket thereof, 1b represents a heat receiver thereof, 1c represents a dish mirror, 1d represents a bracket of the dish mirror, the bracket comprising a sunlight tracker, 2 represents a combustor, 2c represents a movement direction of the combustor, 2d represents a movement terminal of the combustor, 3 represents a position adjustment mechanism of the combustor which may be an air-, liquid-, or electricity-driven telescoping mechanism, 4 represents a biomass gasification device or biomass liquefaction device, 4a represents a gas-storage tank, 4b represents a pump, 4c represents a main switch valve, 4d represents a purifier, 5 represents a branch switch valve, 6 represents a regulating valve, and 7 represents a flexible conveying pipe which is connected to a fuel inlet of the combustor 2.

DETAILED DESCRIPTION OF THE EMBODIMENTS

For further illustrating the invention, experiments detailing a dish-type Stirling solar generator capable of running continuously day and night are described below. It should be noted that the following examples are intended to describe and not to limit the invention.

A dish-type Stirling solar generator capable of running continuously day and night comprises a dish-type Stirling solar generating set provided with a combustor, a position adjustment mechanism, and a fuel supply system. The position adjustment mechanism is disposed on a bracket of the dish-type Stirling solar generating system. The combustor is arranged on the position adjustment mechanism. The position adjustment mechanism is capable of adjusting an opening of the combustor to align with a heat receiver of the dish-type Stirling solar generating set, so that the heat receiver is heated by the flame of the combustor. The fuel supply system is connected to the combustor via a flexible conveying pipe.

Example 1

As shown in FIG. 1, a dish-type Stirling solar generator capable of running continuously day and night comprises a dish-type Stirling solar generating set 1. Each dish-type Stirling solar generating set 1 is provided with a combustor 2, a position adjustment mechanism 3, and a fuel supply system.

The position adjustment mechanism 3 is disposed on a bracket 1a of the dish-type Stirling solar generating system. The combustor 2 is arranged on the position adjustment mechanism 3. The position adjustment mechanism 3 is capable of adjusting the position of the combustor 2 to allow the heat receiver 1b to continue receiving heat at night (or in cloudy and rainy days having no sunlight). The fuel supply system 4 of the combustor supplies fuel for the combustor via a main switch valve 4c, a branch switch valve 5, a regulating valve 6, and a flexible conveying pipe 7.

A driver of the position adjustment mechanism 3 is a linear actuator comprising a pneumatic linear actuator, a hydraulic linear actuator, and an electric linear actuator. A rod of the linear actuator 3 is connected with the combustor. A casing of the driver is fixed on the bracket 1a (if the pneumatic linear actuator is employed, the casing of the air cylinder is fixed on the bracket 1a, and a piston rod of the air cylinder is connected to the combustor).

Obviously, common hydraulic oil cylinder, gas cylinder, and electromagnetic lever can all be utilized as the position adjustment mechanism or part of the position adjustment mechanism.

The fuel supply system of the combustor comprises biomass gasification device or biomass liquefaction device 4 comprising a gas-storage tank 4a, a pump 4b, the main switch valve 4c, the branch switch valve 5, the regulating valve 6, and the flexible conveying pipe 7, which are connected via pipes. A purifier 4d of the gas fuel (liquid fuel) is disposed in a pipe network arranged in front of the fuel storage tank. The purifier 4d of the gas fuel is capable of purifying the fuel.

The regulating valve 6 is used to control the flow of the fuel and to change the intensity of the heat supply.

The branch switch valve 5 is used to control the start or the stop of the fuel supply of a single Stirling solar generator.

Example 2

As shown in FIGS. 2-3, the position adjustment mechanism of the combustor is a bended linkage mechanism. Connecting rods of the bended linkage mechanism are connected via rotary actuators (comprising a pneumatic rotary actuator, a hydraulic rotary actuator, and an electric rotary actuator). The combustor 2 is disposed on an output end of the bended linkage mechanism.

FIG. 2 is a schematic diagram of the position adjustment mechanism of the combustor of the invention where the position adjustment mechanism employs a bended linkage mechanism. FIG. 3 is a local enlarged view of the bended linkage mechanism of the invention. In FIGS. 2 and 3, the reference number 1 represents the dish-type Stirling solar generating set, 1a represents the bracket of the dish-type Stirling solar generating set, 1b represents the heat receiver of the dish-type Stirling solar generating set, 1c represents a dish mirror, 1d represents a bracket of the dish mirror, the bracket comprising a sunlight tracker, 2 represents the combustor, 2d represents an optimum heating position of the combustor, 3d represents a first connecting rod, 3e represents a second connecting rod, 3f represents a third connecting rod, and 3g represents the rotary actuators. An initiating terminal of the first connecting rod 3d is connected to 1a via 3g1. A terminal of 3d is connected to an initiating terminal of 3e via 3g2. A terminal of 3e is connected to an initiating terminal of 3f via 3g3. A terminal of 3f is fixed on the combustor 2. 5 represents a branch switch valve. 6 represents a regulating valve, and 7 represents a flexible conveying pipe which is connected to a fuel inlet of the combustor 2. The branch switch valve 5 is connected to a main switch valve via a fuel conveying pipe, and fuel supply systems in the figures are the same as that in FIG. 1.

Example 3

FIG. 4 is systematic diagram of a Stirling electric power plant of the invention.

In the figure, four dish-type Stirling solar generating sets are combined which share a combustible gas (combustible liquid) supply system. The number of the dish-type Stirling solar generating sets can be increased or decreased based on the desired gross power of a generating plant.

In the figure, the reference number 1 represents a Stirling solar generating set, 1a represents a bracket of the dish-type Stirling solar generating set, 1b represents a heat receiver of the dish-type Stirling solar generating set, 1c represents a dish mirror, 1d represents a bracket of the dish mirror, the bracket comprising a sunlight tracker, 2 represents a combustor, 2c represents a movement direction of the combustor, 2d represents a movement terminal of the combustor, 3 represents a position adjustment mechanism of the combustor which may be an air-, liquid-, or electricity-driven telescoping mechanism, 4 represents a biomass gasification device or biomass liquefaction device, 4a represents a gas-storage tank, 4b represents a pump, 4c represents a main switch valve, 4d represents a purifier, 5 represents a branch switch valve, 6 represents a regulating valve, and 7 represents a flexible conveying pipe which is connected to a fuel inlet of the combustor 2.

The position adjustment mechanism of the combustion device is started at night (or in cloudy or rainy days when the sunlight is not sufficient) to allow the combustor of the combustion device to move to the position of the heat receiver of the dish-type Stirling solar generating set, the fuel is supplied and ignited to heat the heat receiver, so that the dish-type Stirling solar generating set is continued generating power. Thus, the problem that the dish-type Stirling solar generating unit is unable to run stably and continuously work for 24 hours is solved. Particularly, when the biomass combustible gas or the biomass combustible liquid is employed as the fuel, the dish-type Stirling solar generating set is able to operate stably and continuously day and night.

The fuel for the combustion device can be substituted by natural gas (methane, coal mine gas, coking gas, blast furnace gas, or well collected gas) to allow the Stirling solar generating set to continuously operate day and night. Preferably, the biomass gasification gas is employed.

The fuel for the combustion device is biomass liquid fuel, diesel oil, kerosene, gasoline, black mineral oil, carbinol, or alcohol to allow the Stirling solar generating set to continuously operate day and night. Preferably, the biomass gasification liquid is employed.

A solar power station is provided with a plurality of dish-type Stirling solar generating sets (according to the power of the station and the collection area of the solar energy). Each dish-type Stirling solar generating set comprises the combustor arranged on the bracket thereof. The fuel supply system of the combustor is connected to the combustor via the switch valves, the regulating valve, and the flexible conveying pipe to supply fuel to the combustor. The combustor is connected to the position adjustment mechanism. The position adjustment mechanism is disposed on the bracket of the dish-type Stirling solar generating set. Each dish-type Stirling solar generating set is provided with the fuel supply system, or a plurality of dish-type Stirling solar generating sets share the fuel supply system.

The key of the invention is that each dish-type Stirling solar generating set is provided with the combustion device. In conditions of no sunlight (or when the sunlight is not sufficient), the combustor of the combustion device moves to the position of the heat receiver of the Stirling solar generating unit, the combustor is then ignited to heat the heat receiver. Thus, those dish-type Stirling solar generating sets individually provided with the combustion device fall within the scope of the protection of the invention.

The invention claimed is:

1. A Stirling solar generator dish, comprising:
   a Stirling solar generating dish set (1) comprising a combustor (2), a position adjustment mechanism (3), and a bracket (1a), the combustor (2) comprising an opening;
   a fuel supply system (4) of the combustor (2) connected to the combustor (2) via a main switch valve (4c), a branch switch valve (5), a regulating valve (6), and a flexible conveying pipe (7);
   the position adjustment mechanism (3) adjusting the opening of the combustor (2) to align or deviate from a heat receiver of the Stirling solar generating dish set (1);
   the position adjustment mechanism (3) being disposed on the bracket (1a) of the Stirling solar generating dish set (1); and
   the combustor (2) being disposed on the position adjustment mechanism (3).

2. The solar generator of claim 1, wherein the fuel supply system is a combustible gas supply system comprising a gas-storage tank (4a), a pump (4b), the main switch valve (4c), the branch switch valve (5), the regulating valve (6), and the flexible conveying pipe (7), which are connected via pipes.

3. The solar generator of claim 2, wherein the fuel supply system is a biomass supply system comprising a biomass gasification device, a purifier (4d), the gas-storage tank (4a), the pump (4b), the main switch valve (4c), the branch switch valve (5), the regulating valve (6), and the flexible conveying pipe (7), which are connected via the pipes.

4. The solar generator of claim 1, wherein the fuel supply system is a liquid fuel supply system comprising a gas-storage tank (4a), a pump (4b), the main switch valve (4c), the branch switch valve (5), the regulating valve (6), and the flexible conveying pipe (7), which are connected via pipes.

5. The solar generator of claim 4, wherein the fuel supply system is a liquefied biomass supply system comprising a biomass liquefaction device, a purifier (4d), the gas-storage tank (4a), the pump (4b), the main switch valve (4c), the branch switch valve (5), the regulating valve (6), and the flexible conveying pipe (7), which are connected via the pipes.

6. The solar generator of claim 1, wherein the position adjustment mechanism (3) is a telescoping mechanism; a driver of the telescoping mechanism employs a linear actuator; and the combustor (2) is disposed on an output end of the telescoping mechanism.

7. The solar generator of claim 6, wherein the fuel supply system is a combustible gas supply system comprising a gas-storage tank (4a), a pump (4b), the main switch valve (4c), the branch switch valve (5), the regulating valve (6), and the flexible conveying pipe (7), which are connected via pipes.

8. The solar generator of claim 7, wherein the fuel supply system is a biomass supply system comprising a biomass gasification device, a purifier (4d), the gas-storage tank (4a), the pump (4b), the main switch valve (4c), the branch switch valve (5), the regulating valve (6), and the flexible conveying pipe (7), which are connected via the pipes.

9. The solar generator of claim 6, wherein the fuel supply system is a liquid fuel supply system comprising a gas-storage tank (4a), a pump (4b), the main switch valve (4c), the branch switch valve (5), the regulating valve (6), and the flexible conveying pipe (7), which are connected via pipes.

10. The solar generator of claim 9, wherein the fuel supply system is a liquefied biomass supply system comprising a biomass liquefaction device, a purifier (4d), the gas-storage tank (4a), the pump (4b), the main switch valve (4c), the branch switch valve (5), the regulating valve (6), and the flexible conveying pipe (7), which are connected via the pipes.

11. The solar generator of claim 1, wherein the position adjustment mechanism (3) is a bended linkage mechanism comprising connecting rods; the connecting rods are connected via rotary actuators; and the combustor (2) is disposed on an output end of the bended linkage mechanism.

12. The solar generator of claim 11, wherein the fuel supply system is a combustible gas supply system comprising a gas-storage tank (4a), a pump (4b), the main switch valve (4c), the branch switch valve (5), the regulating valve (6), and the flexible conveying pipe (7), which are connected via pipes.

13. The solar generator of claim 12, wherein the fuel supply system is a biomass supply system comprising a biomass gasification device, a purifier (4d), the gas-storage tank (4a), the pump (4b), the main switch valve (4c), the branch switch valve (5), the regulating valve (6), and the flexible conveying pipe (7), which are connected via the pipes.

14. The solar generator of claim 11, wherein the fuel supply system is a liquid fuel supply system comprising a gas-storage tank (4a), a pump (4b), the main switch valve (4c), the branch switch valve (5), the regulating valve (6), and the flexible conveying pipe (7), which are connected via pipes.

15. The solar generator of claim 14, wherein the fuel supply system is a liquefied biomass supply system comprising a biomass liquefaction device, a purifier (4d), the gas-storage tank (4a), the pump (4b), the main switch valve (4c), the branch switch valve (5), the regulating valve (6), and the flexible conveying pipe (7), which are connected via the pipes.

16. The solar generator of claim 11, wherein
   the bended linkage mechanism is a triple linkage mechanism comprising a first connecting rod (3d), a second connecting rod (3e), and a third connecting rod (3f);
   the connecting rods communicate with each other via the rotary actuators (3g); and
   the first connecting rod (3d) is connected to the bracket (1a) of the Stirling solar generating dish set (1) via the rotary actuator (3g).

17. The solar generator of claim 16, wherein the fuel supply system is a combustible gas supply system comprising a gas-storage tank (4a), a pump (4b), the main switch valve (4c), the branch switch valve (5), the regulating valve (6), and the flexible conveying pipe (7), which are connected via pipes.

18. The solar generator of claim 17, wherein the fuel supply system is a biomass supply system comprising a biomass gasification device, a purifier (4d), the gas-storage tank (4a), the pump (4b), the main switch valve (4c), the branch switch valve (5), the regulating valve (6), and the flexible conveying pipe (7), which are connected via the pipes.

19. The solar generator of claim 16, wherein the fuel supply system is a liquid fuel supply system comprising a gas-storage tank (4a), a pump (4b), the main switch valve (4c), the branch switch valve (5), the regulating valve (6), and the flexible conveying pipe (7), which are connected via pipes.

20. The solar generator of claim 19, wherein the fuel supply system is a liquefied biomass supply system comprising a biomass liquefaction device, a purifier (4d), the gas-storage tank (4a), the pump (4b), the main switch valve (4c), the branch switch valve (5), the regulating valve (6), and the flexible conveying pipe (7), which are connected via the pipes.

\* \* \* \* \*